United States Patent
Jung et al.

(10) Patent No.: US 7,287,729 B2
(45) Date of Patent: Oct. 30, 2007

(54) DISPLAY APPARATUS

(75) Inventors: Gyu Jung, Yongin (KR); Hyun-jun Jung, Suwon (KR); Byung-jo Kang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 362 days.

(21) Appl. No.: 10/895,314

(22) Filed: Jul. 21, 2004

(65) Prior Publication Data
US 2005/0051692 A1 Mar. 10, 2005

(30) Foreign Application Priority Data
Jul. 23, 2003 (KR) ............ 10-2003-0050447

(51) Int. Cl.
*A47F 5/00* (2006.01)
(52) U.S. Cl. .............. 248/122.1; 248/176.3; 248/922
(58) Field of Classification Search ........ 248/919–924, 248/121, 122.1, 123.11, 176.3, 371; 361/681–683
See application file for complete search history.

(56) References Cited

U.S. PATENT DOCUMENTS

| | | | | | |
|---|---|---|---|---|---|
| 5,687,944 | A | * | 11/1997 | Shon | 248/349.1 |
| 5,715,138 | A | * | 2/1998 | Choi | 361/681 |
| 6,042,068 | A | * | 3/2000 | Tcherny | 248/221.11 |
| 6,189,842 | B1 | | 2/2001 | Gull et al. | |
| 6,581,893 | B1 | * | 6/2003 | Lu | 248/291.1 |
| 6,601,810 | B2 | * | 8/2003 | Lee | 248/278.1 |
| 6,669,155 | B2 | * | 12/2003 | Ron | 248/276.1 |
| 6,734,922 | B1 | * | 5/2004 | Seo | 348/825 |
| 6,822,857 | B2 | * | 11/2004 | Jung et al. | 361/681 |
| 6,837,469 | B2 | * | 1/2005 | Wu et al. | 248/278.1 |
| 6,850,407 | B2 | * | 2/2005 | Tanimoto et al. | 361/681 |
| 2005/0248912 | A1 | * | 11/2005 | Kang et al. | 361/681 |

FOREIGN PATENT DOCUMENTS

JP 2000-206893 7/2000
JP 2001-75486 3/2001

(Continued)

OTHER PUBLICATIONS

Korean Office Action.

(Continued)

*Primary Examiner*—Korie Chan
(74) *Attorney, Agent, or Firm*—Staas & Halsey LLP

(57) ABSTRACT

A display apparatus having: a display part displaying a picture; a base part supporting the display part; a tilting part provided between the display part and the base part and allowing the display part to be tilted relative to the base part, the tilting part including a tilting body combined to the base part, a tilting shaft rotatably combined to the tilting body, a tilting bracket having a first end combined to the display part and a second end combined to the tilting shaft, and an auxiliary bracket, spaced away from the tilting bracket, and having a first end combined to the display part and a second end combined to the tilting shaft. The display apparatus has a decreased packing volume by folding parallel with the base part, more stably supports a display part by having a reinforcing member, and conveniently swivels the display part relative to the base part.

42 Claims, 14 Drawing Sheets

FOREIGN PATENT DOCUMENTS

| | | |
|---|---|---|
| KR | 95-1968 | 1/1995 |
| KR | 1999-1797 | 1/1999 |
| KR | 1999-18422 | 6/1999 |
| KR | 1999-60272 | 7/1999 |
| KR | 1999-0075312 | 10/1999 |
| KR | 20-175685 | 1/2000 |
| KR | 2000-725 | 1/2000 |
| KR | 20-182807 | 3/2000 |
| KR | 20-184275 | 3/2000 |
| KR | 20-197163 | 7/2000 |
| KR | 20-231314 | 5/2001 |
| KR | 10-322893 | 1/2002 |

OTHER PUBLICATIONS

Korean Office Action for Application No. 10-2003-0050447.

* cited by examiner

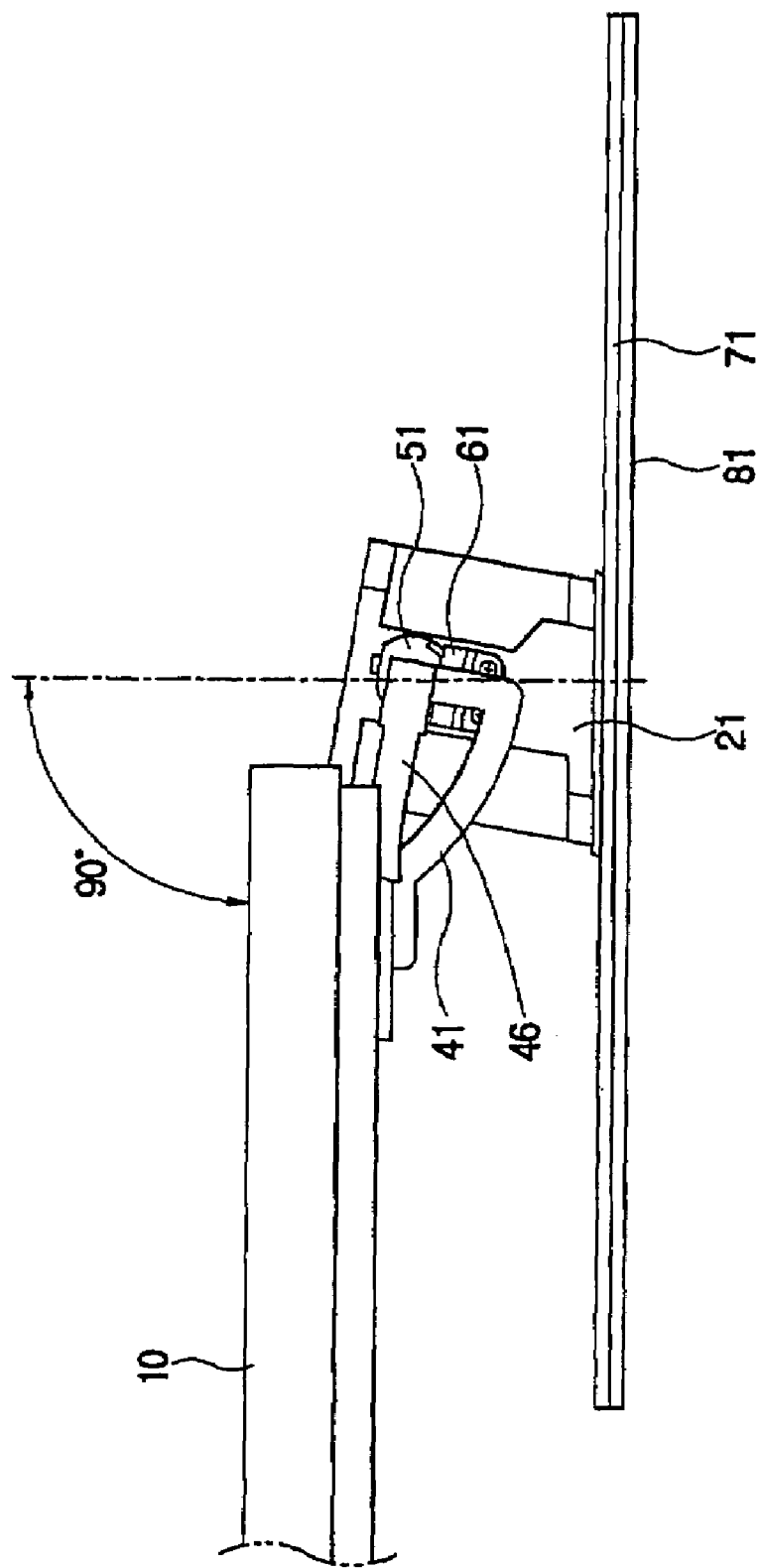

DISPLAY APPARATUS

CROSS-REFERENCE TO RELATED APPLICATIONS

This application claims the benefit of Korean Patent Application No. 2003-50447, filed Jul. 23, 2003, in the Korean Intellectual Property Office, the disclosure of which is incorporated herein by reference.

BACKGROUND OF THE INVENTION

1. Field of the Invention

The present invention relates to a display apparatus, and more particularly, to a display apparatus with an improved supporting structure of a display apparatus.

2. Description of the Related Art

Generally, a television, a monitor for a computer, etc., are collectively called display apparatuses, which comprise a display part to display a picture, and a base part to support the display part.

The display part uses a cathode ray tube (CRT), a liquid crystal display (LCD), a plasma display panel (PDP), etc., to display a picture.

The base part is seated on a place such as a table, and supports the display part.

The display part has recently increased in size to satisfy various customer needs, and the base part is being developed to stably and easily support the large sized display part.

FIG. 1 is an exploded perspective view of a conventional display apparatus. As shown therein, a conventional display apparatus 101 comprises a display part 110 to display a picture, and a base part 170 to support the display part 110.

The display part 110 includes an LCD panel (not shown) on which a picture is displayed, a front cover 120 provided in front of the LCD panel rear of the LCD panel. Further, located in a lower part of the rear cover 130, there is a pair of supporting rod accommodating parts 140 to accommodate supporting rods 190 provided in an upper part of the base part 170 (to be described later).

The base part 170 forms a pair, to support the display part 110, and each includes a base 180 to be seated on a place such as a table, and a supporting rod 190 standing on an upper surface of the base 180.

Thus, in the conventional display apparatus 101, the supporting rods 190, provided one in each base part 170, are inserted in the supporting rod accommodating parts 140 provided in the lower part of the display part 110, so that the base parts 170 support the display part 110.

But in the conventional display apparatus, such supporting rods are not sufficient to stably support the large sized display part. Further, the display part cannot rotate relative to the base part, so that not only it is inconvenient to use, but also it results in a relatively large packing volume.

SUMMARY OF THE INVENTION

Accordingly, it is an aspect of the present invention to provide a display apparatus, in which a display part is stably supported, convenient to use, and decreased in a packing volume, compared to a conventional display apparatus.

Additional aspects and/or advantages of the invention will be set forth in part in the description which follows and, in part, will be obvious from the description, or may be learned by practice of the invention.

The foregoing and/or other aspects of the present invention are achieved by providing a display apparatus comprising: a display part to display a picture; a base part to support the display part; a tilting part provided between the display part and the base part and allowing the display part to be tilted relative to the base part, the tilting part including a tilting body combined to the base part, a tilting shaft rotatably combined to the tilting body, a tilting bracket having a first end combined to the display part and a second end combined to the tilting shaft, and an auxiliary bracket, spaced away from the tilting bracket, and having a first end combined to the display part and a second end combined to the tilting shaft.

According to an aspect of the invention, the tilting body comprises a shaft accommodating part positioned in a first direction of the display part to accommodate the tilting shaft.

According to an aspect of the invention, the tilting part comprises a friction member interposed between the shaft accommodating part and the tilting shaft, to generate a frictional force inhibiting rotation of the tilting shaft relative to the tilting body.

According to an aspect of the invention, the tilting part further comprises at least one tilting angle restricting part engaged with the tilting shaft and the tilting body, to restrict a tilting angle of the tilting shaft relative to the tilting body.

According to an aspect of the invention, the at least one tilting angle restricting part comprises: a rotation restricting washer engaged with the tilting shaft, to rotate together with the tilting shaft, and having first and second projections spaced from each other; and a stopper having a first part combined to the tilting body and a second part disposed between the first and second projections to restrict the tilting angle of the tilting shaft relative to the tilting body.

According to an aspect of the invention, the first and second projections contact with the stopper, respectively, when the display part is tilted in a first rotational direction and a second rotational direction opposite the first rotational direction, respectively, so that rotation of the display part relative to the base part is restricted within from about −5° to about 90°.

According to an aspect of the invention, the rotation restricting washer comprises: a protruding part disposed between the first and second projections, wherein when the display part is tilted in the first and second rotational directions, the first projection and the protruding part respectively contact the stopper, so that the rotation of the display part relative to the base part is restricted within from about −5° to about 15° about the tilting shaft, and when the display part is tilted farther in the second rotational direction, the protruding part elastically pushes the stopper and rotates along the tilting body and the stopper, and the second projection contacts with the stopper, so that the display part is stopped from rotating.

According to an aspect of the invention, the stopper comprises: a first stopper contacting a surface of the rotation restricting washer, and capable of being elastically separated from the surface of the rotation restricting washer by the rotation of the protruding part; and a second stopper outwardly bent from the first stopper and accommodating the protruding part.

According to an aspect of the invention, the tilting bracket and the auxiliary bracket each form a pair, located at opposite ends of the tilting shaft, respectively.

According to an aspect of the invention, the display apparatus further comprises: a reinforcing member combined to first ends of the pair of tilting brackets, and to the display part.

According to an aspect of the invention, the base part comprises an upper base combined to the tilting body; and a lower base, rotatably combined to the upper base about a first axis.

According to an aspect of the invention, the base part comprises: a swiveling angle restricting part, to restrict swiveling of the upper base relative to the lower base.

According to an aspect of the invention, the swiveling angle restricting part comprises: at least one swiveling projection provided on a bottom of the upper base; and a projection guide provided on an upper surface of the lower base and having an arc shape, and corresponding to the at least one swiveling projection, to accommodate and guide the swiveling projection.

According to an aspect of the invention, the projection guide limits a rotation angle of the swiveling projection to a range of about 90°.

According to an aspect of the invention, the base part comprises: a sliding member interposed between the upper base and the lower base, allowing the upper base to rotate relative to the lower base.

According to an aspect of the invention, the sliding member has an annular shape; and the sliding member has an upper surface combined to the upper base, and a lower surface contacting with the lower base.

BRIEF DESCRIPTION OF THE DRAWINGS

These and/or other aspects and advantages of the present invention will become apparent and more readily appreciated from the following description of the embodiments, taken in conjunction with the accompany drawings of which:

FIGS. 7A through 9B are side views illustrating tilted states of a display part in the display apparatus of FIG. 2.

DETAILED DESCRIPTION OF THE PREFERRED EMBODIMENTS

Figure 1:
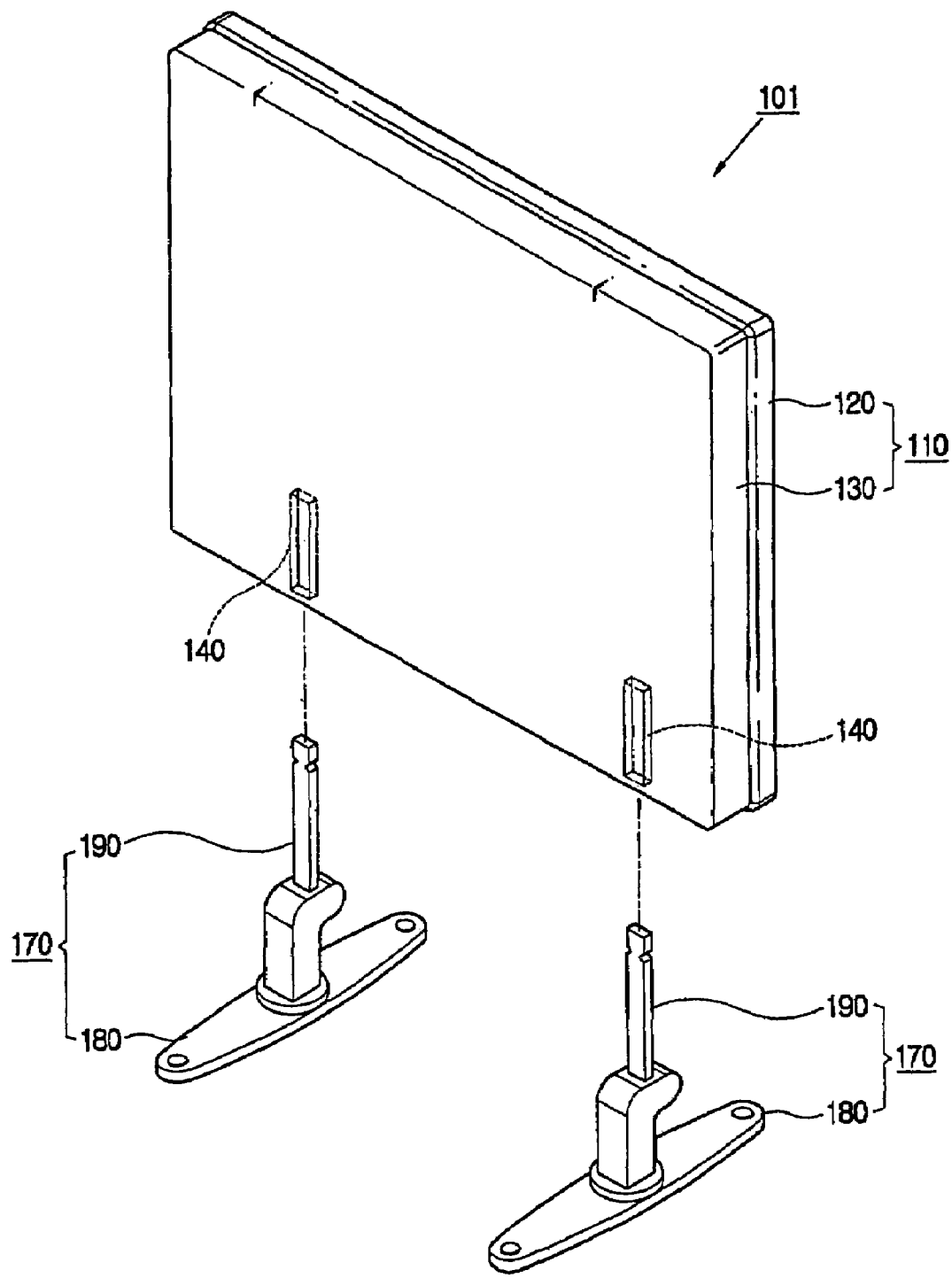
FIG. 1 is an exploded perspective view of a conventional display apparatus.
Figure 2:
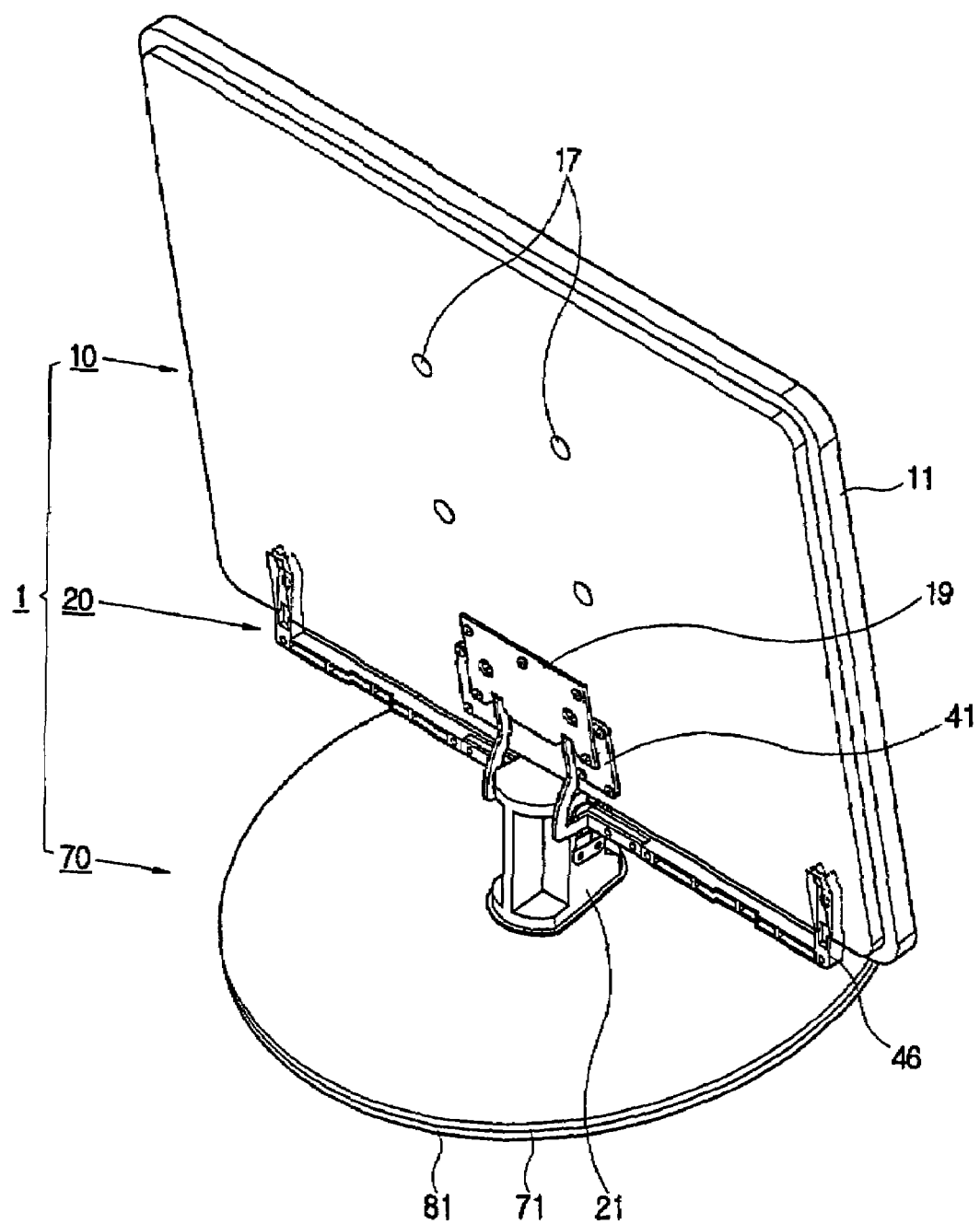
FIG. 2 is a perspective view of a display apparatus according to an embodiment of the present invention.
Figure 3:
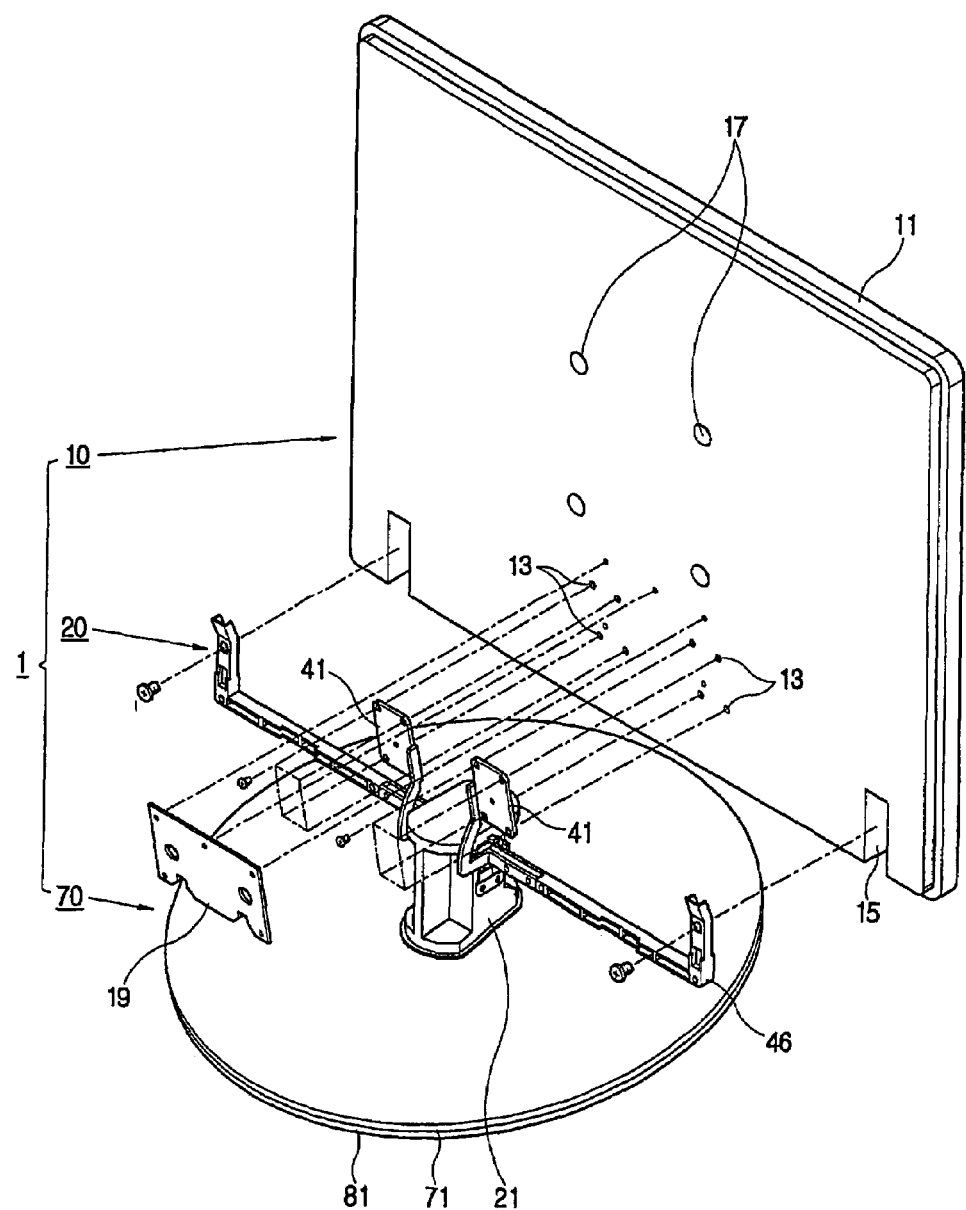
FIG. 3 is an exploded perspective view of the display apparatus of FIG. 2.
Figure 4:
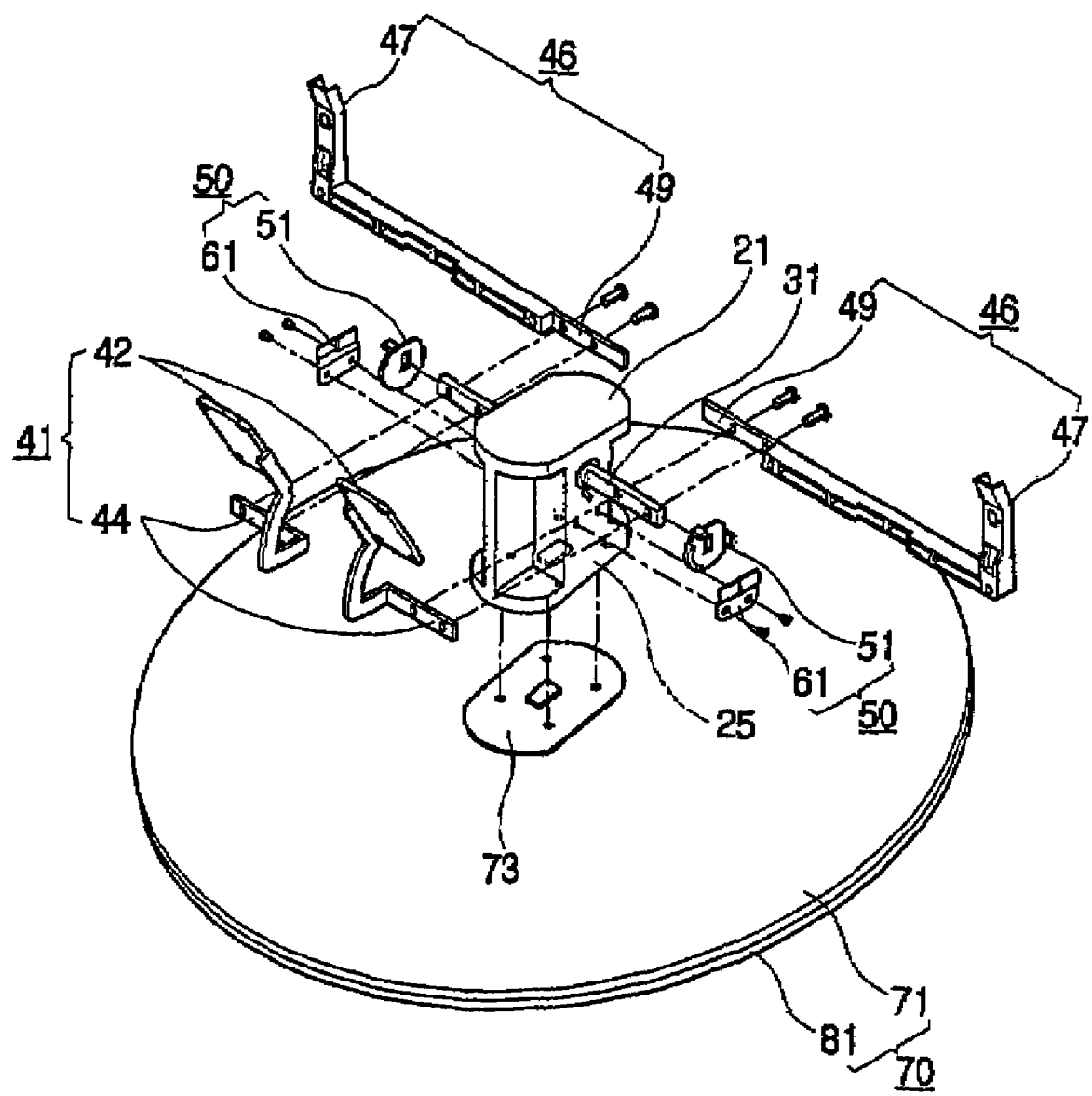
FIGS. 4 and 5 are partly exploded perspective views of a tilting part in the display apparatus of FIG. 2.
Figure 5:
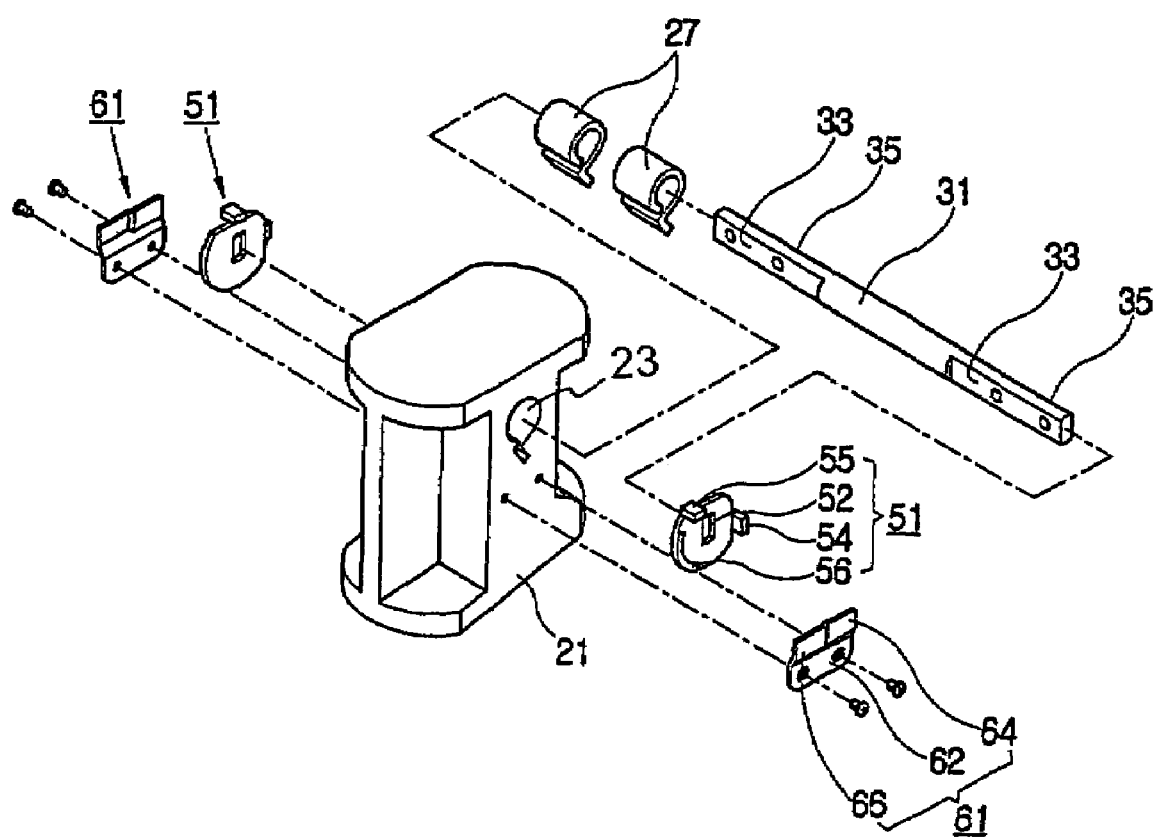
Figure 6:
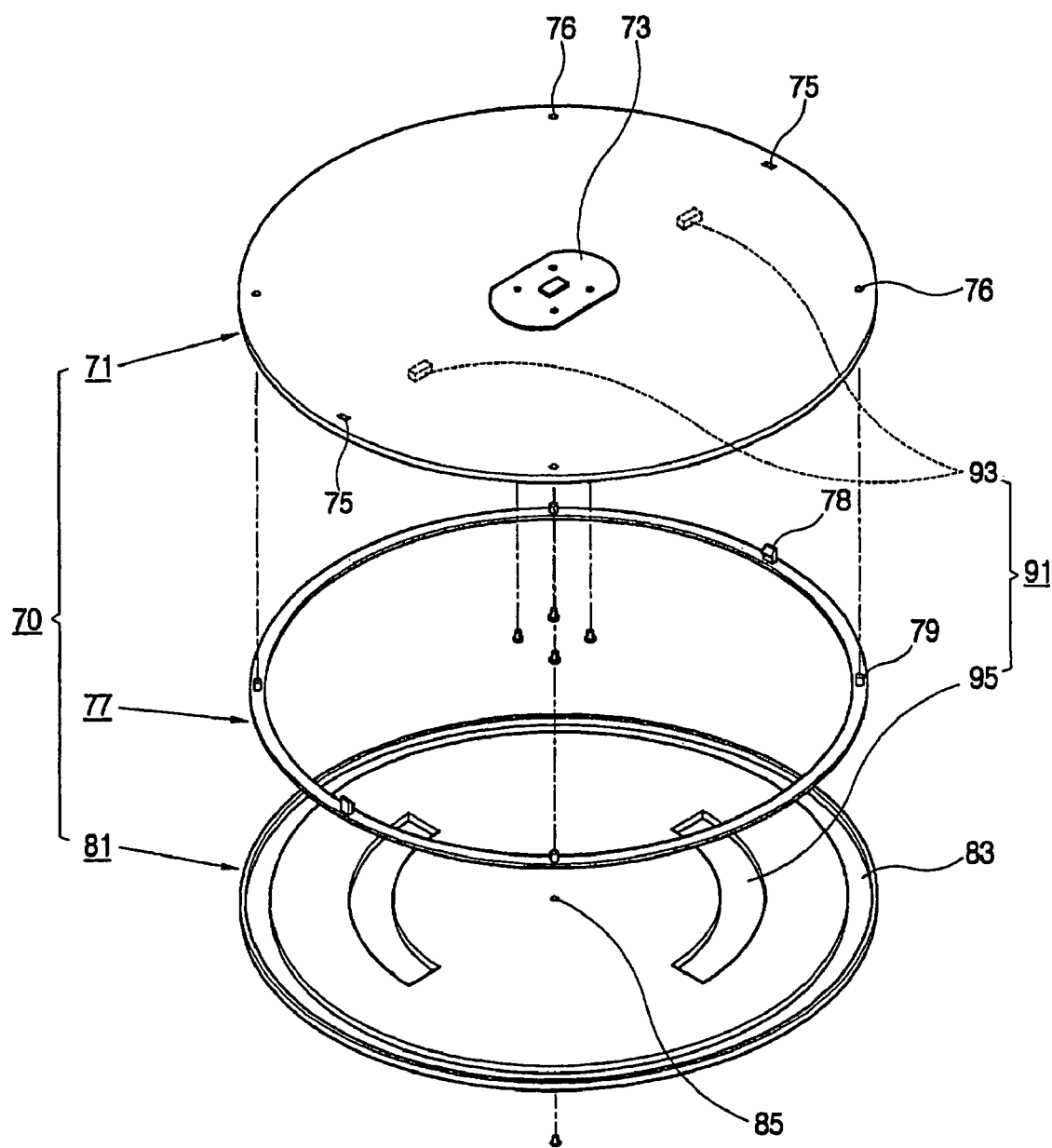
FIG. 6 is an exploded perspective view of a base part in the display apparatus of FIG. 2.

Reference will now be made in detail to embodiments of the present invention, examples of which are illustrated in the accompanying drawings, wherein like reference numerals refer to the like elements throughout. The embodiments are described below to explain the present invention by referring to the figures.

Hereinafter, a television, a monitor for a computer, etc., will be collectively called a display apparatus, and the display apparatus uses a cathode ray tube (CRT), a liquid crystal display (LCD), a plasma display panel (PDP), etc., to display a picture. Further, in this embodiment, the display apparatus using the LCD will be exemplarily described with reference to the accompanying drawings.

As is shown in FIGS. 2 through 6, a display apparatus 1 according to an embodiment of the present invention comprises a display part 10 to display a picture, a base part 70 to support the display part 10, and a tilting part 20 provided between the display part 10 and the base part 70 and allowing the display part 10 to be tilted relative to the base part 70.

The display part 10 includes an LCD panel (not shown) on which a picture is displayed, and a frame 11 provided in a rear of the LCD panel and supporting the LCD panel. According to one aspect, the display part 10 further includes a front cover (not shown) provided in front of the LCD panel, and a rear cover provided in rear of the frame 11.

On the rear surface of the frame 11, there is provided a tilting bracket mounting part 13 to which a first tilting combining part 42 of a tilting bracket 41 (to be described later) is combined. In lower opposite sides of the rear surface of the frame 11, there are provided auxiliary bracket mounting parts 15 to which first auxiliary combining parts 47 of an auxiliary bracket 46 (to be described later) are combined. On a center of the rear surface of the frame 11, there is provided a display mounting part 17, through which the display part 10 can be mounted to a wall-mounting bracket (not shown) or an arm stand (not shown). Here, the tilting bracket mounting part 13 and the auxiliary bracket mounting part 15 are combined with the first tilting combining part 42 of the tilting bracket 41 and the first auxiliary combining part 47 of the auxiliary bracket 46, respectively, by screws.

According to one aspect, the display mounting parts 17 includes four screw holes spaced from each other on the center of the rear surface of the frame 11. Further, according to one aspect, the space between the screw holes is determined according to the size of the display part 10. According to one aspect, the space between the screw holes correspond to the wall-mounting bracket or the arm stand to be mounted to the display part 10. According to one aspect, the space between the screw holes accords with a VESA (video electronic standard association) standard.

The tilting part 20 is connected to the display part 10 and the base part 70, and supports the display part 10 to tilt relative to the base part 70, that is, to rotate forward and backward relative to the base part 70. The tilting part 20 includes: a tilting body 21 combined to the base part 70; a tilting shaft 31 rotatably combined to the tilting body 21; the tilting bracket 41, having a first end combined to the display part 10 and a second end combined to the tilting shaft 31; and the auxiliary bracket 46, having a first end combined to the display part 10 and being spaced from the tilting bracket 41, and a second end combined to the tilting shaft 31. According to one aspect, the tilting part 20 includes a friction member 27 interposed between the tilting shaft 31 and the tilting body 21, to generate a frictional force against a rotating motion of the tilting shaft 31 relative to the tilting body 21. Further, according to one aspect, the tilting part 20 includes at least one tilting angle restricting part 50 provided between the tilting shaft 31 and the tilting body 21, to restrict a tilting angle of the tilting shaft 31 relative to the tilting body 21.

The tilting body 21 is shaped like a cylinder, and is placed between the display part 10 and the base part 70. The tilting body 21 includes a shaft accommodating part 23 to which the tilting shaft 31 is horizontally accommodated, and a base combining part 25, provided in a lower part of the tilting body 21 and combined to the base part 70.

The tilting shaft 31 is inserted in the shaft accommodating part 23 of the tilting body 21, and has noncircular parts provided at opposite ends thereof, wherein each noncircular part has a tilting bracket combining side 33, to which a second tilting combining part 44 of the tilting bracket 41 (to be described later) is combined, and an auxiliary bracket combining side 35, to which a second auxiliary combining part 49 of the auxiliary bracket 46 is combined. According to one aspect, the tilting bracket combining side 33 and the auxiliary bracket combining side 35 of the tilting shaft 31 are combined with the second tilting combining part 44 of the tilting bracket 41 and the second auxiliary combining part 49 of the auxiliary bracket 46, respectively, by screws. According to one aspect, the tilting bracket combining side 33 is positioned in the rear on opposite sides of the tilting shaft 31, and the auxiliary bracket combining side 35 is positioned in the front, on opposite sides of the tilting shaft 31.

The tilting bracket 41 includes the first tilting combining part 42, which is combined to the tilting bracket mounting part 13 of the frame 11, and the second tilting combining part 44, which is combined to the tilting bracket combining side 33 of the tilting shaft 31. According to one aspect, the first tilting combining part 42 and the second tilting combining part 44 are combined to the tilting bracket mounting part 13 of the frame 11 and the tilting bracket combining side 33 of the tilting shaft 31, respectively, by screws. According to one aspect, the tilting bracket 41 forms a pair, being provided at left and right sides of the tilting body 21, respectively. Further, to reinforce the combination between the tilting bracket 41 and the display part 10, according to one aspect, there is provided a reinforcing member 19, which is combined with both the first tilting combining parts 42 of the pair of tilting brackets 41, and the rear surface of the frame 11. According to one aspect, the reinforcing member 19 is combined with both the first tilting combining parts 42 of the pair of tilting brackets 41 and the rear surface of the frame 11 by screws.

The auxiliary bracket 46 is shaped like a long bar, disposed parallel to the tilting shaft 31, having a first end angled corresponding to the frame 11. Further, the auxiliary bracket 46 has a first end provided with the first auxiliary combining part 47, which is combined to the auxiliary bracket mounting part 15 of the frame 11, and a second end provided with the second auxiliary combining part 49, which is combined to the auxiliary bracket combining side 35 of the tilting shaft 31. According to one aspect, the first auxiliary combining part 47 and the second auxiliary combining part 49 of the auxiliary bracket 46, are combined to the auxiliary bracket mounting part 15 of the frame 11, and the auxiliary bracket combining side 35 of the tilting shaft 31, respectively, by screws. Further, the auxiliary bracket 46 forms a pair, being provided, respectively, at the opposite ends of the tilting shaft 31.

The friction member 27 forms a pair, and is interposed between the shaft accommodating part 23 of the tilting body 21 and the tilting shaft 31 to generate the frictional force against the rotating motion of the tilting shaft 31 relative to the tilting body 21. According to one aspect, the friction member 27 is a flat spring, in contact with an outer surface of the tilting shaft 31 and having a protruding end to be irrotatably fitted with the shaft accommodating part 23. According to one aspect, the frictional force occurring between the friction member 27 and the tilting shaft 31 is strong enough to prevent the display part 10 from rotating due to its weight, that is, greater than a moment of weight of the display part 10 about the tilting shaft 31.

The tilting angle restricting part 50 includes a rotation restricting washer 51 engaged with the tilting shaft 31 and rotating together with the tilting shaft 31, and a stopper 61 having a first part combined to the tilting body 21 and a second part contacting with the rotation restricting washer 51 to stop the tilting shaft 31 from rotating.

The rotation restricting washer 51 includes a shaft engaging part 52 having a noncircular shape and engaged with the tilting shaft 31, and first and second projections 54 and 55 spaced from each other and contacting the stopper 61 according to the rotation.

The fist and second projections 54 and 55 contact the stopper 61 when the display part 10 is tilted forward and backward, respectively, so that the rotation of the display part 10 relative to the base part 70 is restricted to a first predetermined angle range. According to one aspect, the first angle range is restricted by the first and second projections 54 and 55 within from forward 5° to backward 90°, with respect to a vertical line, when the base part 70 is seated on a horizontal surface. In this embodiment, the forward rotation of the display part 10 with respect to the vertical line will be referred to as a "negative(−)" direction, and the backward rotation will be referred to as a "positive(+)" direction. At this time, the tilting range of the display part 10 relative to the base part 70 is within from about negative 5° to about positive 90°. When the display part 10 is tilted at an angle of positive 90°, the display part 10 is folded parallel with the base part 70.

According to one aspect, rotation restricting washer 51 includes a protruding part 56 disposed between the first and second projections 54 and 55.

The protruding part 56 protrudes from the rotation restricting washer 51, having an arc shape. The protruding part 56 contacts the stopper 61 together with the first projection 54 when the display part 10 is tilted forward and backward, so that the rotation of the display part 10 relative to the base part 70 is restricted to a second predetermined angle range. According to one aspect, the second angle range is restricted by the protruding part 56 and the first projection 54 within from about −5° (forward) to about 15° (backward). According to one aspect, when the display part 10 is tilted backward beyond the second angle range, the protruding part 56 elastically pushes the stopper 61 and rotates along the stopper 61, so that the second projection 55 contacts with the stopper 61.

The stopper 61 has the first part provided with a stopper combining part 62 combined to the tilting body 21, wherein the stopper combining part 62 is combined to the tilting body 21 by screws. Further, the stopper 61 has the second part including a first stopper 64 contacting with a surface of the rotation restricting washer 51 and capable of being elastically separated from the surface of the rotation restricting washer 51 by the rotation of the protruding part 56, and a second stopper 66 outwardly bent from the first stopper 64 and accommodating the protruding part 56. But, the second angle range can be varied by changing the angle and the position of the protruding part 56, the first and second projections 54 and 55, and the stopper 61.

The base part 70 includes an upper base 71 combined to the tilting body 21, and a lower base 81 rotatably combined to the upper base 71, about a vertical axis. According to one aspect, the base part includes a swiveling angle restricting part 91. Further, the base part 70 includes a sliding member 77 provided between the upper base 71 and the lower base 81, and allowing the upper base 71 to rotate relative to the lower base 81.

The upper base 71 is shaped like a circular plate, and has a tilting body combining part 73 provided on the center of the circular plate and combined with the base combining part 25 of the tilting body 21. According to one aspect, the tilting body combining part 73 is combined with the base combining part 25 by screws. Further, the upper base 71 is rotatable about the vertical axis of the lower base 81, so that the display part 10 can be swiveled relative to the vertical axis of the lower base 81. According to one aspect, a plurality of first and second protrusion accommodating parts 75 and 76, to which first and second protrusions 78 and 79 provided in the sliding member 77 (to be described later) are locked, respectively, are positioned on a rim of the upper base 71.

The lower base 81 is shaped like a circular plate, similar to the upper base 71, and has an upper base combining part 85 provided on the center of the circular plate and rotatably combined with the upper base 71. According to one aspect, the upper base combining part 85 is combined with the upper base 71 by screws. Further, a rim of the lower base 81 has a sliding guide 83 to contact and guide the sliding member 77 slidably.

The sliding member 77 has an annular shape, and is interposed between the upper base 71 and the lower base 81. Located on an upper surface of the sliding member 77, are the plurality of first and second protrusions 78 and 79, to be locked to the first and second protrusion accommodating parts 75 and 76, respectively. Here, the sliding member 77 rotates together with the upper base 71 at the same time, with a lower surface of the sliding member 77 being guided by the sliding guide 83 of the lower base 81. Due to the weight of the tilting body 21 combined to the upper base 71 and the display part 10, there is a frictional force between the sliding member 77 and sliding guide 83, against the rotation.

The first protrusion 78 protrudes from the upper surface of the sliding member 77, and has a hook that locks to the first protrusion accommodating part 75.

The swiveling angle restricting part 91 includes at least one swiveling projection 93 provided on a bottom of the upper base 71, and a projection guide 95 provided on an upper surface of the lower base 81, which has an arc shape to accommodate and guide the swiveling projection 93.

According to one aspect, the swiveling projection 93 forms a pair, being symmetrically spaced from the center of the upper base 71.

According to one aspect, the projection guide 95 is an arc-shaped groove, accommodating the pair of swiveling projections 93. According to one aspect, the swiveling angle is restricted to a range of from about 0° to about 90°. That is, the display part 10 can be swiveled at an angle of about 45° in respective left and right directions. According to another aspect, the projection guide 95 is designed to change the swiveling angle range of the swiveling projection 93 into a range of from about 0° to about 180°.

With this configuration, the display apparatus 1 operates as follows.

Figure 7A:
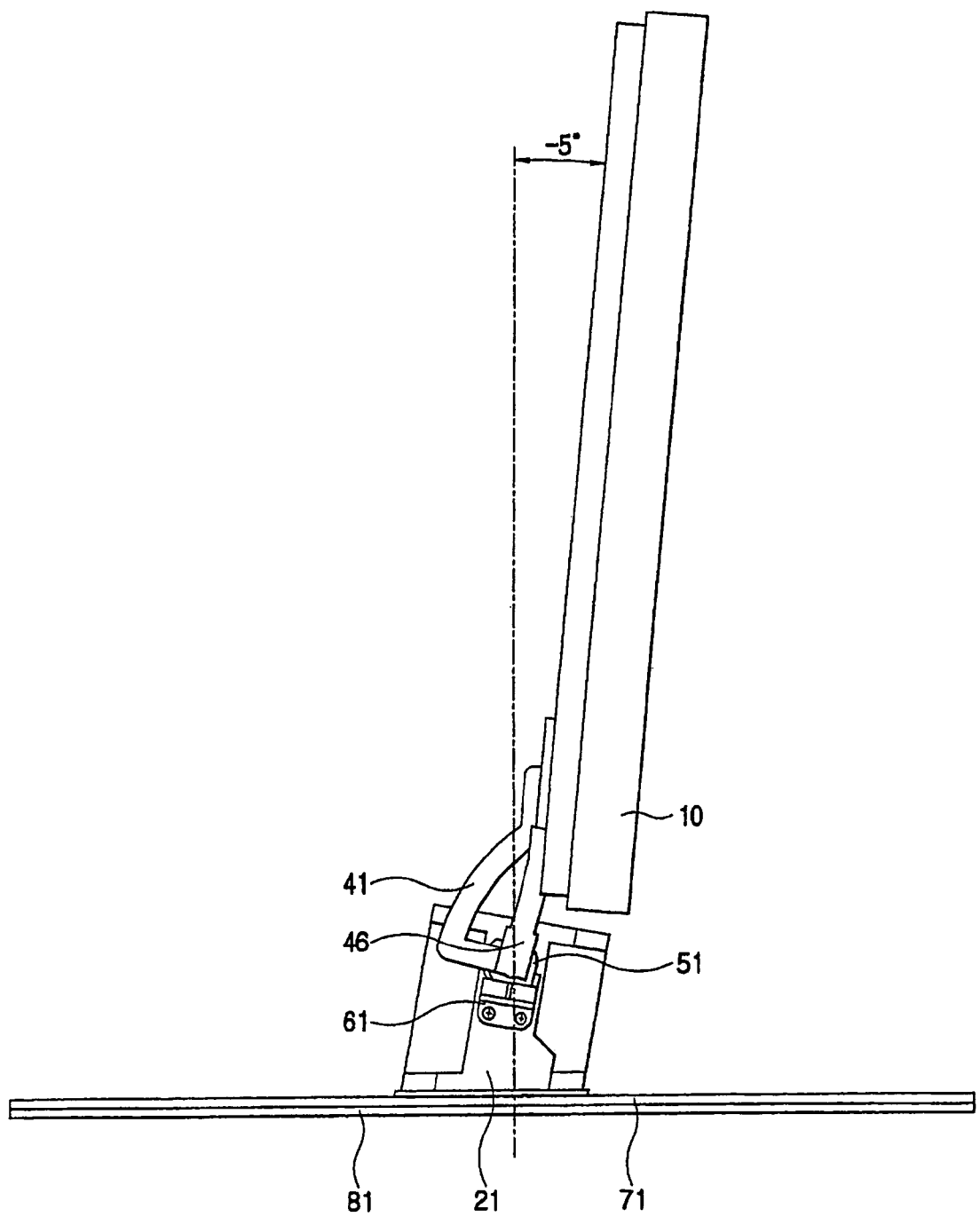
Figure 7B:
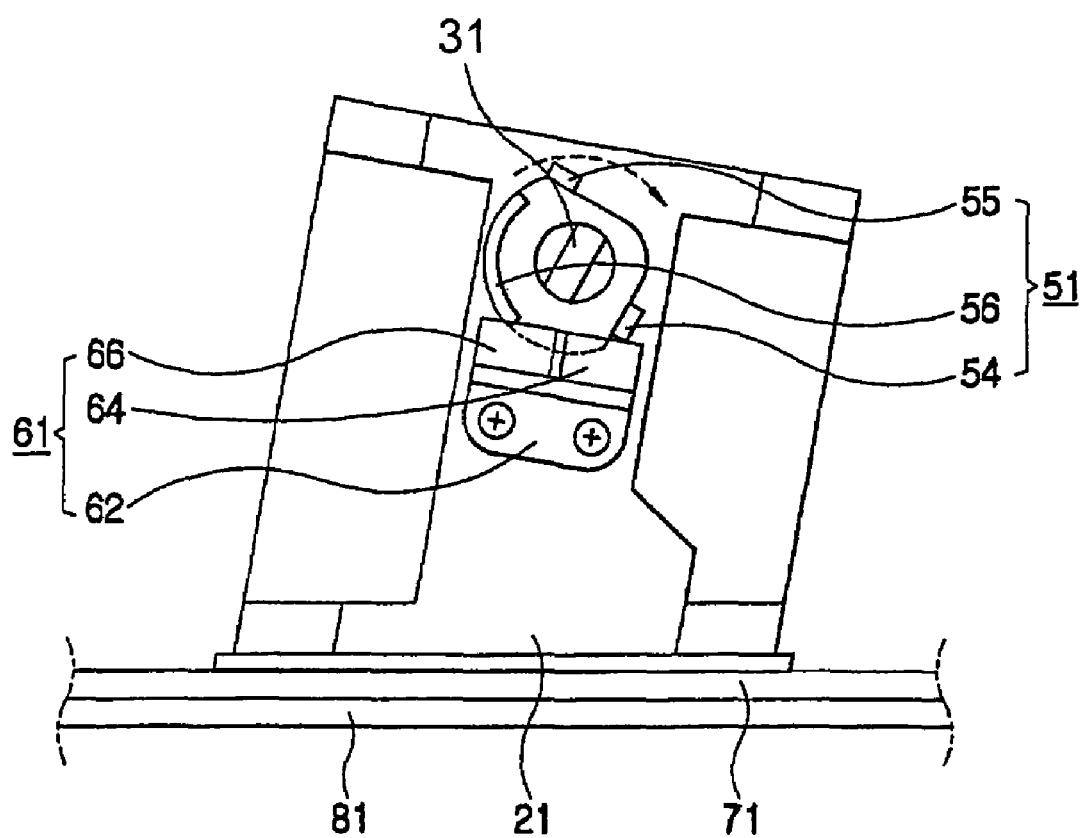

First, the display part 10 is tilted forward relative to the base part 70, as is shown in FIGS. 7A and 7B. At this time, the display part 10 can be tilted forward until the first projection 54 of the rotation restricting washer 51, engaged with the tilting shaft 31, is stopped by the first stopper 64, wherein the display part 10 is stopped at the forward angle of about 5° with respect to a vertical line.

Figure 8A:
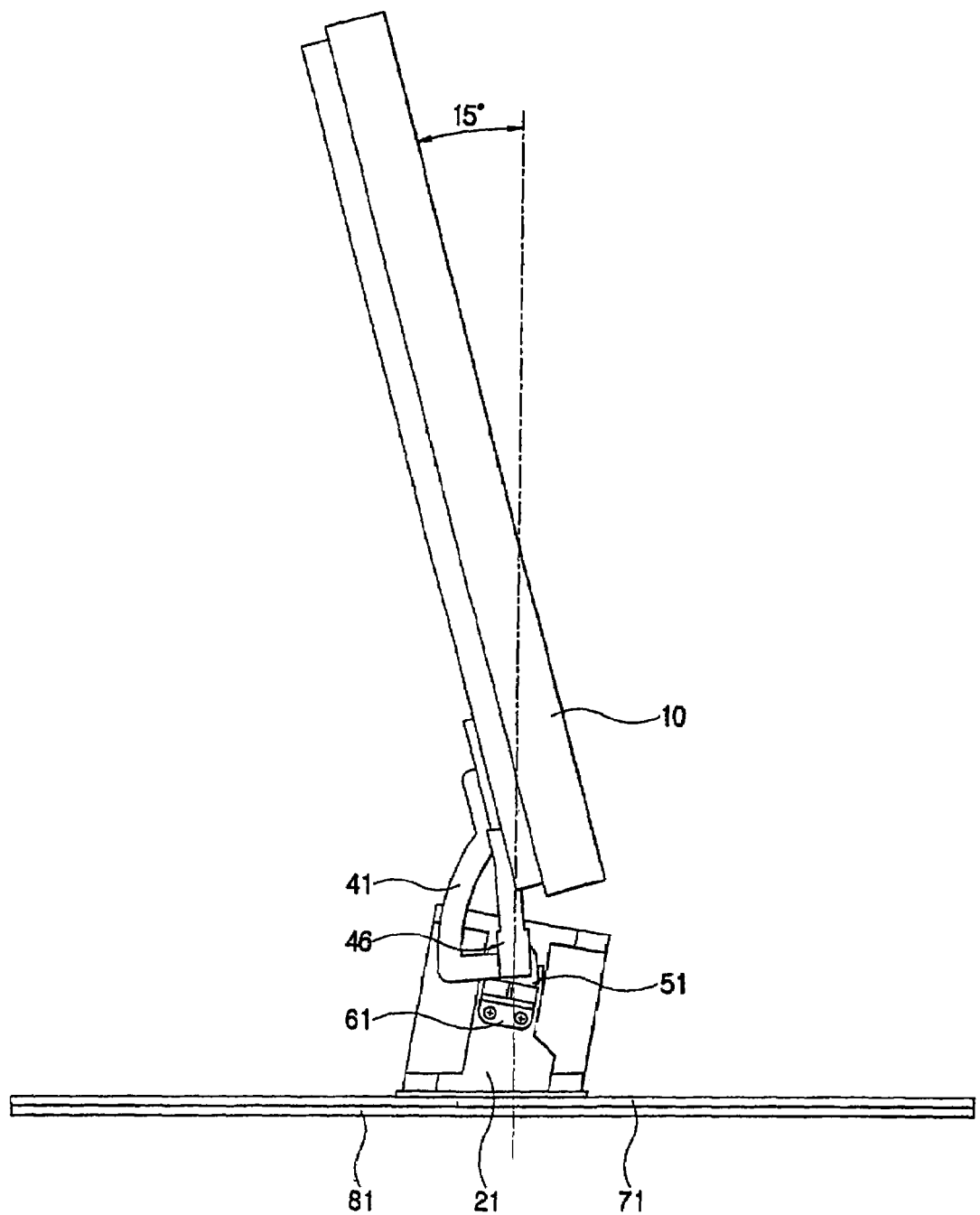
Figure 8B:
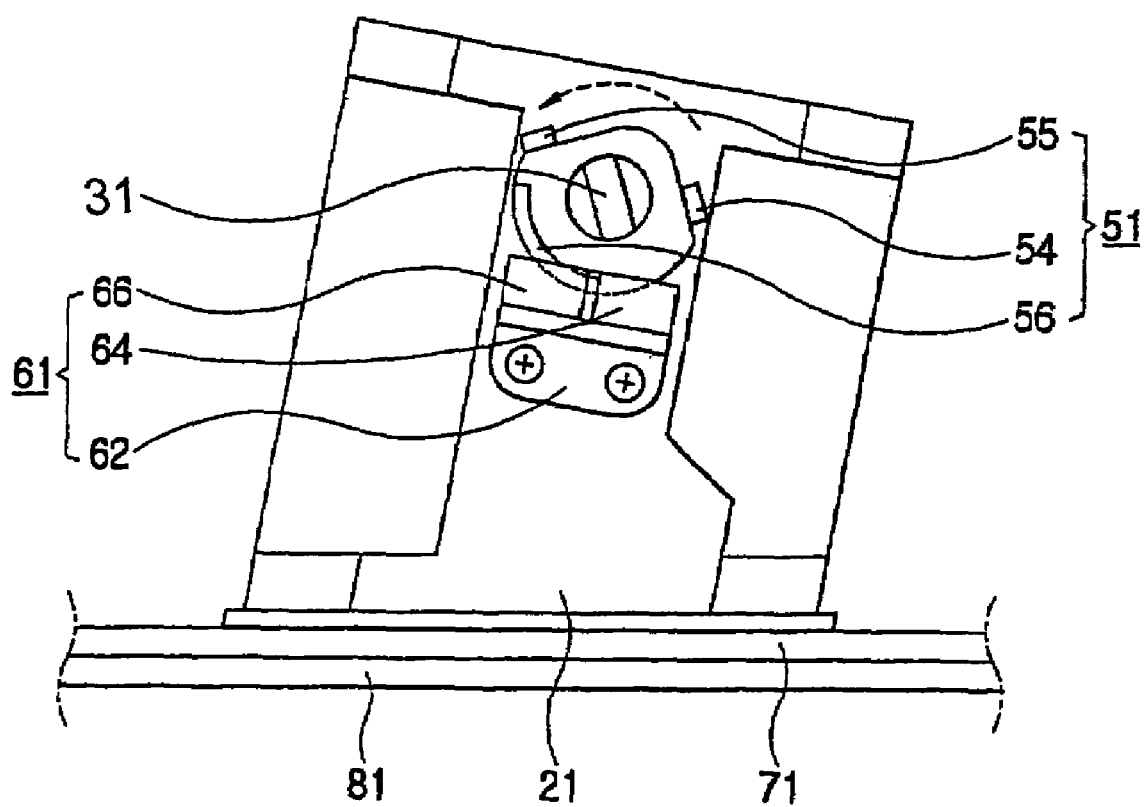

The display part 10 also tilts backward relative to the base part 70, as is shown in FIGS. 8A and 8B. At this time, the display part 10 can be tilted backward until the protruding part 56 of the rotation restricting washer 51 is accommodated in the second stopper 66 of the stopper 61 and stopped by the first stopper 64, wherein the display part 10 is stopped at the backward angle of 15° with respect to the vertical line.

Figure 9B:
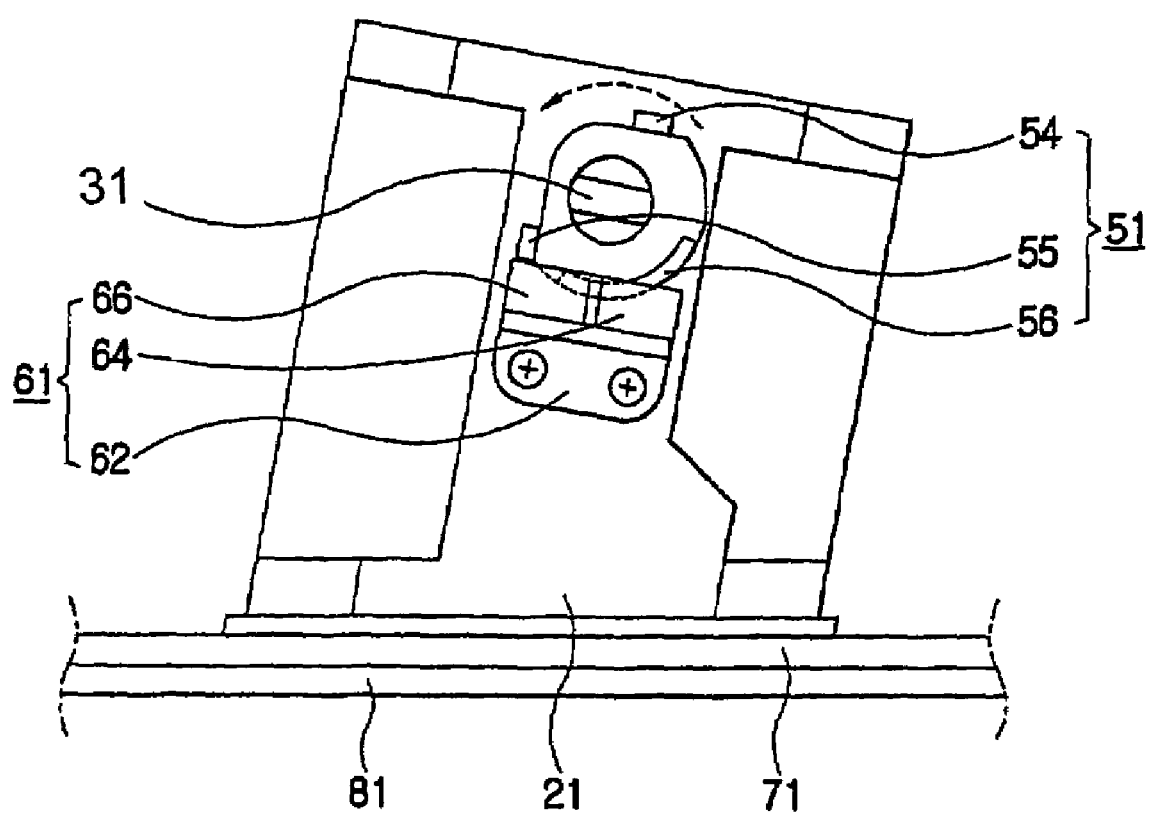

Further, the display part 10 tilts farther backward relative to the base part 70, as is shown in FIGS. 9A and 9B. At this time, the display part 10 can be tilted until the protruding part 56 of the rotation restricting washer 51 elastically pushes and rotates along the first stopper 64 of the stopper 61, and the second projection 55 is stopped by the second stopper 66, wherein the display part 10 is stopped at the backward angle of about 90° with respect to the vertical line, being folded parallel with the base part 70.

Thus, the display apparatus 1 tilts forward and backward relative to the base part 70, so that it is convenient to use. Particularly, the display apparatus 1 folds parallel with the base part 70, so that a packing volume thereof is decreased.

Further, the display apparatus 1 comprises the tilting bracket 41 and the auxiliary bracket 46 to tiltably support the display part 10, so that the display part 10 is stably supported even if the display part 10 has a relatively large size.

Further, the display apparatus 1 comprises the reinforcing member 19 to reinforce the combination between the tilting bracket 41 and the display part 10, so that the display part 10 is more stably supported.

Figure 10A:
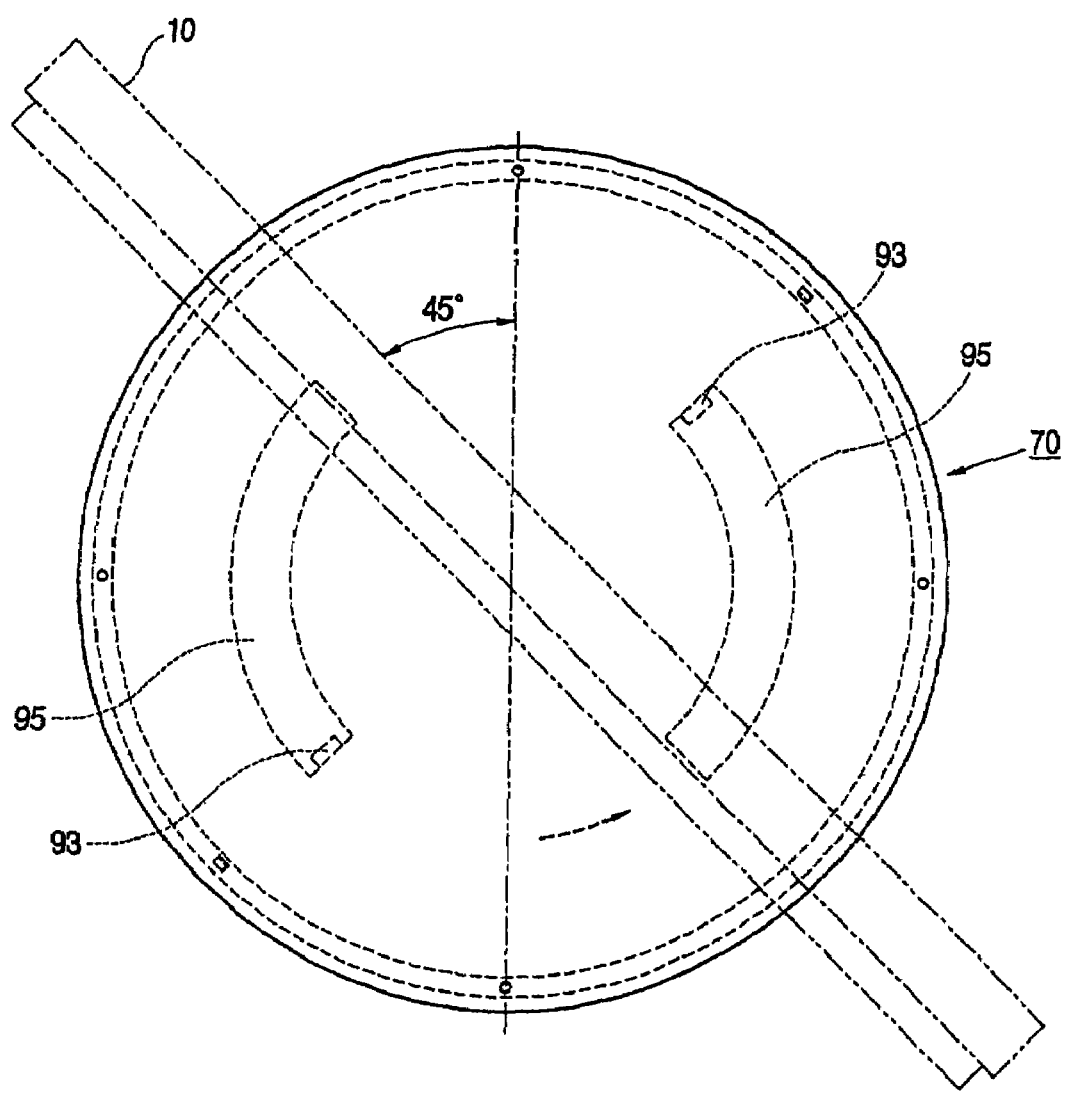
FIGS. 10A and 10B are plan views illustrating operation of the base part of the display apparatus of FIG. 2.
Figure 10B:
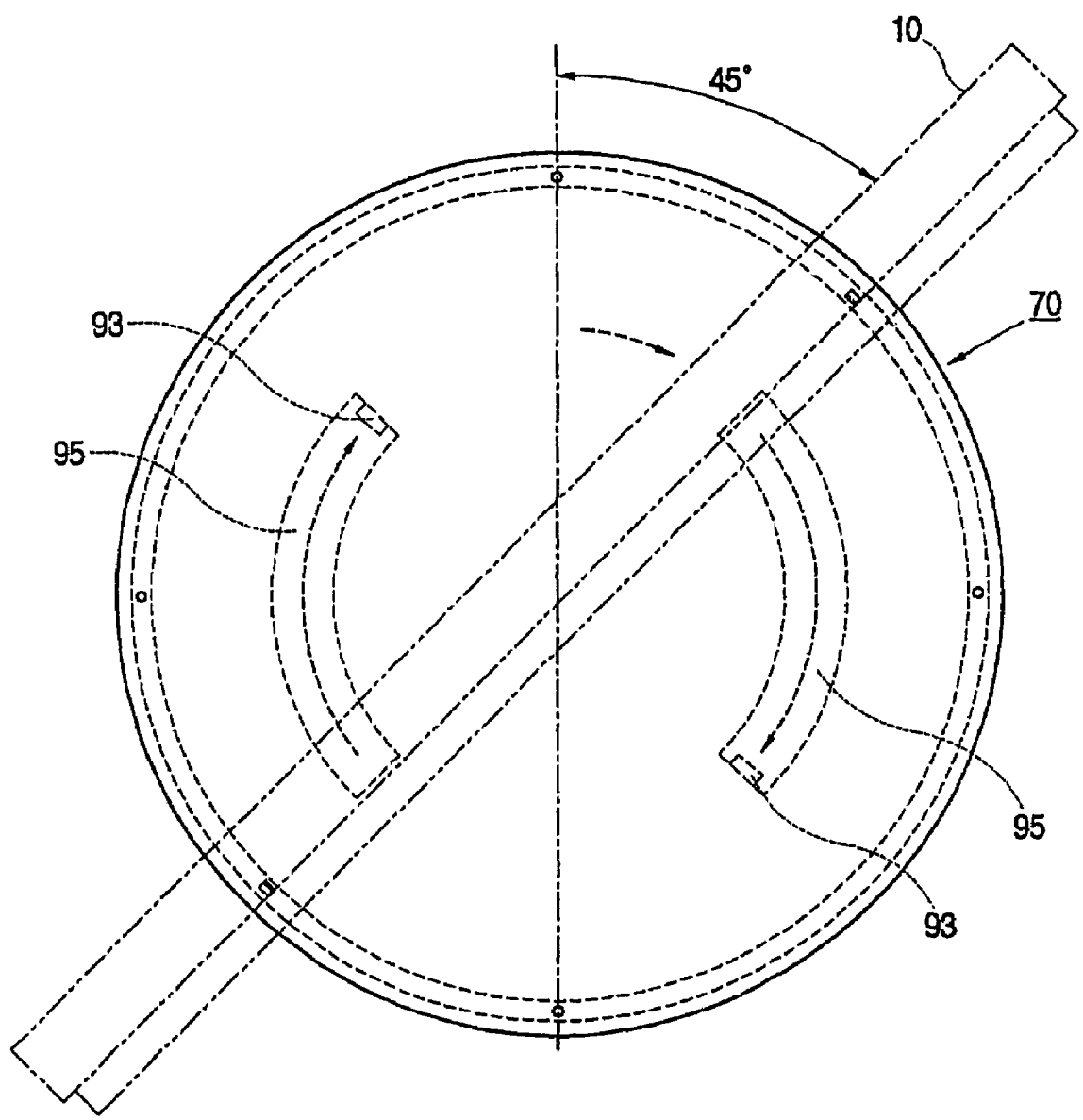

On the other hand, the display part 10 also swivels relative to the base part 70, as is shown in FIGS. 10A and 10B. At this time, the display part 10 swivels at an angle of about 45° in respective left and right directions as the swiveling projection 93 of the swiveling angle restricting part 91 is guided along the projection guide 95.

Thus, the display apparatus 1 according to the present invention swivels in the left and right directions relative to the base part 70, so that it is convenient to use.

As described above, the present invention provides the display apparatus 1 with a decreased packing volume, accomplished by being folded parallel with the base part 70, that more stably supports the display part 10 by including a reinforcing member, and conveniently swivels the display part 10 relative to the base part 70.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display apparatus comprising:
    a display part to display a picture;
    a base part to support the display part;
    a tilting part provided between the display part and the base part and allowing the display part to be tilted relative to the base part,
    the tilting part including a tilting body combined to the base part, a tilting shaft rotatably combined to the tilting body, a tilting bracket having a first end combined to the display part and a second end combined to the tilting shaft, and an auxiliary bracket, spaced away from the tilting bracket, and having a first end combined to the display part and a second end combined to the tilting shaft, and at least one tilting angle restricting part engaged with the tilting shaft and the tilting body, to restrict a tilting angle of the tilting shaft relative to the tilting body,
    wherein the at least one tilting angle restricting part comprises:
        a rotation restricting washer engaged with the tilting shaft, to rotate together with the tilting shaft, and having first and second projections spaced from each other; and
        a stopper having a first part combined to the tilting body, and a second part disposed between the first and second projections to restrict the tilting angle of the tilting shaft relative to the tilting body.

2. The display apparatus according to claim 1, wherein the tilting body comprises:
a shaft accommodating part positioned in a first direction of the display part to accommodate the tilting shaft.

3. The display apparatus according to claim 2, wherein the tilting part comprises:
a friction member interposed between the shaft accommodating part and the tilting shaft, to generate frictional force inhibiting rotation of the tilting shaft relative to the tilting body.

4. The display apparatus according to claim 1, wherein the first and second projections contact the stopper, respectively, when the display part is tilted in a first rotational direction and a second rotational direction opposite the first rotational direction, respectively, so that rotation of the display part relative to the base part is restricted within from about −5° to about 90° with respect to the tilting shaft.

5. The display apparatus according to claim 4, wherein the rotation restricting washer comprises:
a protruding part disposed between the first and second projections.

6. The display apparatus according to claim 5, wherein:
when the display part is tilted in the first and second rotational directions, the first projection and the protruding part respectively contact the stopper, so that the rotation of the display part relative to the base part is restricted within from about −5° to about 15° with respect to the tilting shaft; and
when the display part is tilted farther in the second rotational direction, the protruding part elastically pushes the stopper and rotates along the tilting body and the stopper, and the second projection contacts the stopper, so that the display part is stopped from rotating.

7. The display apparatus according to claim 6, wherein the stopper comprises:
a first stopper contacting a surface of the rotation restricting washer, and elastically separable from the surface of the rotation restricting washer by the rotation of the protruding part; and
a second stopper outwardly bent from the first stopper and accommodating the protruding part.

8. The display apparatus according to claim 1, wherein:
the tilting bracket is formed as a pair as a pair of tilting brackets, located at opposite ends of the tilting shaft, respectively, and
the auxiliary bracket is formed as a pair of auxiliary brackets, located at opposite ends of the tilting shaft, respectively.

9. The display apparatus according to claim 8, further comprising:
a reinforcing member combined to first ends of the pair of tilting brackets, and to the display part.

10. The display apparatus according to claim 1, wherein the base part comprises:
an upper base combined to the tilting body; and
a lower base, rotatably combined to the upper base about a first axis.

11. The display apparatus according to claim 10, wherein the base part comprises:
a swiveling angle restricting part, to restrict swiveling of the upper base relative to the lower base.

12. The display apparatus according to claim 11, wherein the swiveling angle restricting part comprises:
at least one swiveling projection provided on a bottom of the upper base; and
a projection guide provided on an upper surface of the lower base and having an arc shape, and corresponding to the at least one swiveling projection, to accommodate and guide the swiveling projection.

13. The display apparatus according to claim 12, wherein:
the projection guide limits a rotation angle of the swiveling projection to a range of about 90°.

14. The display apparatus according to claim 9, wherein the base part comprises:
an upper base combined to the tilting body; and
a lower base rotatably combined to the upper base about a first axis.

15. The display apparatus according to claim 14, wherein the base part comprises:
a swiveling angle restricting part, to restrict swiveling of the upper base relative to the lower base.

16. The display apparatus according to claim 15, wherein the swiveling angle restricting part comprises:
at least one swiveling projection provided on a bottom of the upper base; and
a projection guide provided on an upper surface of the lower base and having an arc shape corresponding to the at least one swiveling projection, to accommodate and guide the swiveling projection.

17. The display apparatus according to claim 16, wherein:
the projection guide limits a rotation angle of the swiveling projection to a range of about 9°.

18. The display apparatus according to claim 11, wherein the base part comprises:
a sliding member interposed between the upper base and the lower base, allowing the upper base to rotate relative to the lower base.

19. The display apparatus according to claim 18, wherein:
the sliding member has an annular shape; and
the sliding member has an upper surface combined to the upper base, and a lower surface contacting with the lower base.

20. The display apparatus according to claim 15, wherein the base part comprises:
a sliding member interposed between the upper base and the lower base, allowing the upper base to rotate relative to the lower base.

21. The display apparatus according to claim 20, wherein:
the sliding member has an annular shape; and
the sliding member has an upper surface combined to the upper base, and a lower surface contacting the lower base.

22. A display apparatus, comprising:
a display frame;
a base;
a tilting body connected to the base;
a tilting shaft, rotatably connected to the tilting body;
a tilting bracket connected to the tilting shaft and connected to the display frame; and
an auxiliary bracket connected to the tilting shaft and connected to the display frame,
wherein
the tilting bracket forms a pair of tilting brackets, disposed respectively at opposite ends of the tilting shaft,
first and second engaging surfaces are located opposite to each other on an end of the tilting shaft,
the tilting bracket is connected to the first engaging surface, and
the auxiliary bracket is connected to the second engaging surface.

23. The display apparatus according to claim 22, further comprising:
a reinforcing member connected to the pair of tilting brackets and connected to the display frame.

24. The display apparatus according to claim 22, wherein each of the pair of tilting brackets comprises:
a first tilting combining part connected to the display frame; and
a second tilting combining part connected to the tilting shaft.

25. A display apparatus, comprising:
a display frame;
a base;
a tilting body connected to the base;
a tilting shaft, rotatably connected to the tilting body;
a tilting bracket connected to the tilting shaft and connected to the display frame; and
an auxiliary bracket connected to the tilting shaft and connected to the display frame,
wherein
the auxiliary bracket forms a pair of auxiliary brackets, disposed respectively at opposite ends of the tilting shaft,
each of the pair of auxiliary bracket comprises a first auxiliary combining part connected to the display frame and a second auxiliary combining part connected to the tilting shaft, and
the second auxiliary combining part extends axially from the tilting shaft and the first auxiliary combining part extends approximately perpendicularly from the second auxiliary combining part.

26. The display apparatus according to claim 25, wherein:
a first end of the second auxiliary combining part connects to the tilting shaft; and
the first auxiliary combining part extends from a second end of the second auxiliary combining part, opposite the first end of the second auxiliary combining part.

27. The display apparatus according to claim 22, wherein the base comprises:
an upper base; and
a lower base rotatably connected to the upper base.

28. The display apparatus according to claim 27, wherein the base further comprises:
a sliding member connected to the upper base, and rotatably seated in a sliding guide provided in the lower base.

29. The display apparatus according to claim 27, wherein the base further comprises:
a swiveling projection connected to the upper base, and moving in a projection guide provided in the lower base, to limit rotation of the upper base with respect to the lower base.

30. The display apparatus according to claim 29, wherein:
the projection guide is an arc-shaped groove in the lower base, and
a range of rotation of the upper base with respect to the lower base is established by the swiveling projection contacting respective ends of the projection guide.

31. The display apparatus according to claim 30, wherein the range of rotation is approximately 90°.

32. The display apparatus according to claim 30, wherein the range of rotation is approximately 180°.

33. A display apparatus, comprising:
a display frame;
a base;
a tilting body connected to the base;
a tilting shaft, rotatably connected to the tilting body;
a tilting bracket connected to the tilting shaft and connected to the display frame;
an auxiliary bracket connected to the tilting shaft and connected to the display frame; and
a tilting angle restricting part, to restrict rotation of the tilting shaft with respect to the tilting body, and having a rotation restriction washer disposed on, and rotating with the tilting shaft, and a stopper part connected to the tilting body and engaging the rotation restriction washer,
wherein
the tilting body is provided with a shaft accommodating part, and
the tilting shaft is inserted into the shaft accommodating part and rotates with respect to the tilting body,
the stopper part comprises a stopper combining part connected to the tilting body, a first stopper, and a second stopper, and
the rotation restriction washer comprises a shaft engaging part, engaging the tilting shaft, a first projection, a second projection, and a protruding part.

34. The display apparatus according to claim 33, wherein the apparatus further comprises:
a friction member interposed between the tilting shaft and the shaft accommodating part, to inhibit rotation of the tilting shaft.

35. The display apparatus according to claim 34, wherein the friction member forms a pair.

36. The display apparatus according to claim 34, wherein:
the friction member is a flat spring in contact with an outer surface of the tilting shaft, and has a protruding end irrotatably fitted with the shaft accommodating part.

37. The display apparatus according to claim 34, wherein:
the friction member induces a frictional force on the tilting shaft greater than a moment of a weight of the display frame about the tilting shaft.

38. The display apparatus according to claim 33, wherein the tilting angle restricting part forms a pair disposed respectively on opposite sides of the tilting body.

39. The display apparatus according to claim 33, wherein the first projection contacts the first stopper to establish a first rotational limit of the tilting shaft,
the protruding part contacts the first stopper to establish a second rotational limit of the tilting shaft, and
the second projection contacts the second stopper to establish a third rotational limit of the tilting shaft.

40. The display apparatus according to claim 39, wherein:
a rotational range of the tilting shaft between the first rotational limit and the second rotational limit is approximately 20°;
a rotational range of the tilting shaft between the second rotational limit and the third rotational limit is approximately 75°; and
a rotational range of the tilting shaft between the first rotational limit and the third rotational limit is approximately 95°.

41. The display apparatus according to claim 39, wherein:
when the tilting shaft rotates between the second and third rotational limits, the protruding part elastically pushes, and rotates along the first stopper.

42. The display apparatus according to claim 39, wherein:
the base contacts a surface on which the display apparatus is placed; and
when the second projection contacts the second stopper, the display frame is approximately parallel to the surface.

* * * * *